H. M. SUTTON & W. L. & E. G. STEELE.
PROCESS OF AND APPARATUS FOR SEPARATING AND GRADING SEEDS.
APPLICATION FILED AUG. 14, 1914.

1,133,760. Patented Mar. 30, 1915.
3 SHEETS—SHEET 3.

Witnesses
U. A. Williams
Alex F. Wright

Inventors
Henry M. Sutton,
Walter L. Steele,
Edwin G. Steele,
By E. A. Stocking
Attorney

UNITED STATES PATENT OFFICE.

HENRY M. SUTTON, WALTER L. STEELE, AND EDWIN G. STEELE, OF DALLAS, TEXAS.

PROCESS OF AND APPARATUS FOR SEPARATING AND GRADING SEEDS.

1,133,760.      Specification of Letters Patent.      Patented Mar. 30, 1915.

Application filed August 14, 1914. Serial No. 856,809.

*To all whom it may concern:*

Be it known that we, HENRY M. SUTTON, WALTER L. STEELE, and EDWIN G. STEELE, citizens of the United States of America, residing at Dallas, in the county of Dallas and State of Texas, have invented certain new and useful Improvements in Processes of and Apparatus for Separating and Grading Seeds, of which the following is a specification, reference being had therein to the accompanying drawing.

This invention relates to a process of and an apparatus for separating and grading seeds and has for its object, the provision of an apparatus by means of which, an elongate seed can be separated from a substantially spherical seed and it is of especial advantage in separating wheat kernels from oat kernels and consists first, in separating the largest grains of oats from the wheat and small defective grains of oats; second, in separating the lighter grains of oats from the wheat; and third, in grading the grains of wheat in proportion to their specific qualities.

Another object of the invention is to provide an apparatus in which an initial separation takes place in order to separate the long seeds from the more spherical seeds; said spherical seeds being discharged upon a transversely inclined pervious deck on which they are propelled by the pushing action of the table longitudinally along the deck; means being provided for supporting the seed upon a gaseous cushioning medium in order to allow the seeds to stratify; the heavier seeds being pushed by the propelling movement of the table while the lighter seeds are acted on by gravity and are moved transversely, or approximately so, on the table deck.

Another object of the invention is to provide a novel form of air baffles for retarding the lighter spherical seeds propelled upon the deck by the propelling action of the table, whereby the more spherical kernels of oats will be retarded and repelled.

Another object of the invention is to provide an apparatus by means of which the wheat kernels can be graded so as to separate the infertile from the fertile grains, whereby the infertile grains can be sent to the mill and the fertile grains used for planting.

Another object of the invention is to provide a separating and grading apparatus which is exceedingly simple and cheap in construction and one in which the cost of operating is reduced to a minimum, whereby the same can be employed in large mills and operated so as to thoroughly separate the oat grains from the wheat grains, at the same time, the wheat being graded.

Another object of the invention is to provide a screening unit in connection with a separating table having a perforated screening surface provided with guards of concaved conformation, to cause the oat grain to slide toward the center of the guard, so as to prevent the same from passing through the perforation; the mass of grain upon the screen forcing the same to turn over and move downwardly upon the screen, the more spherical grains passing through the perforations.

Another object of the invention is to provide means for passing an air current through the screen in order to force back the longer grains of seed; said current being insufficient to retard the movement of the spherical grains of seed, whereby these seeds are deposited upon the pervious deck of the separating table and by the propelling movement thereof, are propelled longitudinally of the table. The lighter seeds are supported by a gaseous cushioning medium and are acted upon by gravity and gradually work their way off of the delivery side of the table while the heavy seeds which are in contact with the pervious deck, are propelled thereby over the surface until they have reached the delivery end of the table; these seeds being the fertile seeds of the mass being separated.

Another object of the invention is to provide means for retarding the lighter and more spherical seeds in their longitudinal movement over the separating surface or deck through the medium of air baffles which blow the lighter seeds backward against the propelling action of the table and by providing a number of these air-retarding baffles, the lighter seeds are progressively separated from the heavier particles and are delivered off of the side of the separating table into suitable receptacles provided for collecting the different grades of seeds.

Other and further objects and advantages of the invention will be hereinafter set forth and the novel features thereof defined by the appended claims.

In the drawings Fig. 12, is a detail section of the screening surface showing the movement of the different shaped seeds in their passage over the screening surface, the oat grain striking the guard in such a manner that it is prevented from passing through the screening surface while the wheat grain, which strikes the guard is allowed free passage by gravity to pass through the same; the mass of seeds upon the screening surface coming into contact with the oat grains in the position shown, which causes the same to turn over away from the opening and to travel down the inclined screening surface off of the discharge end thereof while the wheat kernels drop through the openings and are deposited upon the separating surface within the frame of the screen from which they are propelled out through the gate thereof by the propelling movement of the table.

Like numerals of reference refer to like parts in the several figures of the drawings.

In the drawings, 1 indicates a base frame for supporting our separating table which is provided with cup bearings 2 in which are mounted obliquely arranged spring supports 3 which are inclined toward the head motion of the table and upon which is mounted a transversely inclined pervious table 4 having a connection with a driving mechanism 5 through the medium of the drive rod 6 for reciprocating the table longitudinally, the construction of table and driving mechanism being substantially the same as shown in our Patent #898,020 granted September 8, 1908, by means of which, a slow advance and a quick return movement is obtained in order to propel the seeds longitudinally upon the table. The table is preferably formed of a rectangular frame and casing 7 which forms an air chamber having suitable connecting nipples not shown, to which are connected flexible air inlet pipes 9 extending from a supply pipe 10 which is connected to a source of supply 11, herein shown a rotary blower, but it is, of course, understood that any construction of blower for supplying air thereto can be used without departing from the spirit of our invention; the object being to maintain a uniform air pressure within the chamber for the purpose of supporting the seed upon the pervious deck of the table upon a gaseous cushioning medium in order to allow the seed to stratify as clearly set forth in our previously mentioned patent.

The form of table herein shown and described, is substantially the same as shown in our Patent #898,020 which has a floor free from obstructions and impervious to the passage of small particles of material therethrough while pervious to air under pressure and has formed along its lower edge, a delivery shelf 12 and along its end a similar delivery shelf, not shown, which are provided with the usual cutting fingers for the well-known purpose. This form of table has the usual means for adjusting the transverse inclination thereof and is adapted to be reciprocated continuously when in operation so that the seeds fed upon the same will be propelled longitudinally thereof through the medium of the pushing action of the pervious deck upon the seeds in contact therewith, the lighter seeds which are supported by the gaseous cushioning medium, moving by gravity transversely of the table, or approximately so, as when the table is propelled the heavier seeds are pushed out from under the lighter seeds.

While we have shown and described a separating table constructed substantially in the same manner as shown in our previous Patents #797,239 granted August 15, 1905; #898,020, granted September 8, 1908 and #979,046 granted September 10, 1910, in order to carry out our process of separating and grading seeds, other forms of table could be employed; the essential feature being the provision of a longitudinally reciprocating table having a transversely inclined pervious separating surface and, therefore, we do not wish to limit ourselves to any exact form of table as various forms could be employed for carrying out our process, without departing from the spirit of our invention.

In connection with a table as hereinbefore described, in order to carry out our process successfully, to meet the commercial demands in a separating and grading apparatus, an initial screening unit 14 is employed which comprises a frame 15 having a foraminated screening surface 16, the openings thereof being provided with guards upon their under sides having a conformation of such a shape that the elongated grains will be prevented from passing through the screening surface while the more spherical grains are allowed free passage. This initial screening unit is placed on the feed end of the separating table and is provided with a receiving hopper 13 having a gate-controlled opening 17 for controlling the flow of the seed upon the screening surface. The seeds are delivered to the receiving hopper 13 from a discharge hopper 18 which is provided with an open top into which extends a grain spout 19 commonly employed in grain elevators; said hopper 18 being provided with a gate-controlled opening as clearly shown and constructed substantially the same as shown in our Patent #1,073,644 granted September 23, 1913.

Figures 1, 13:
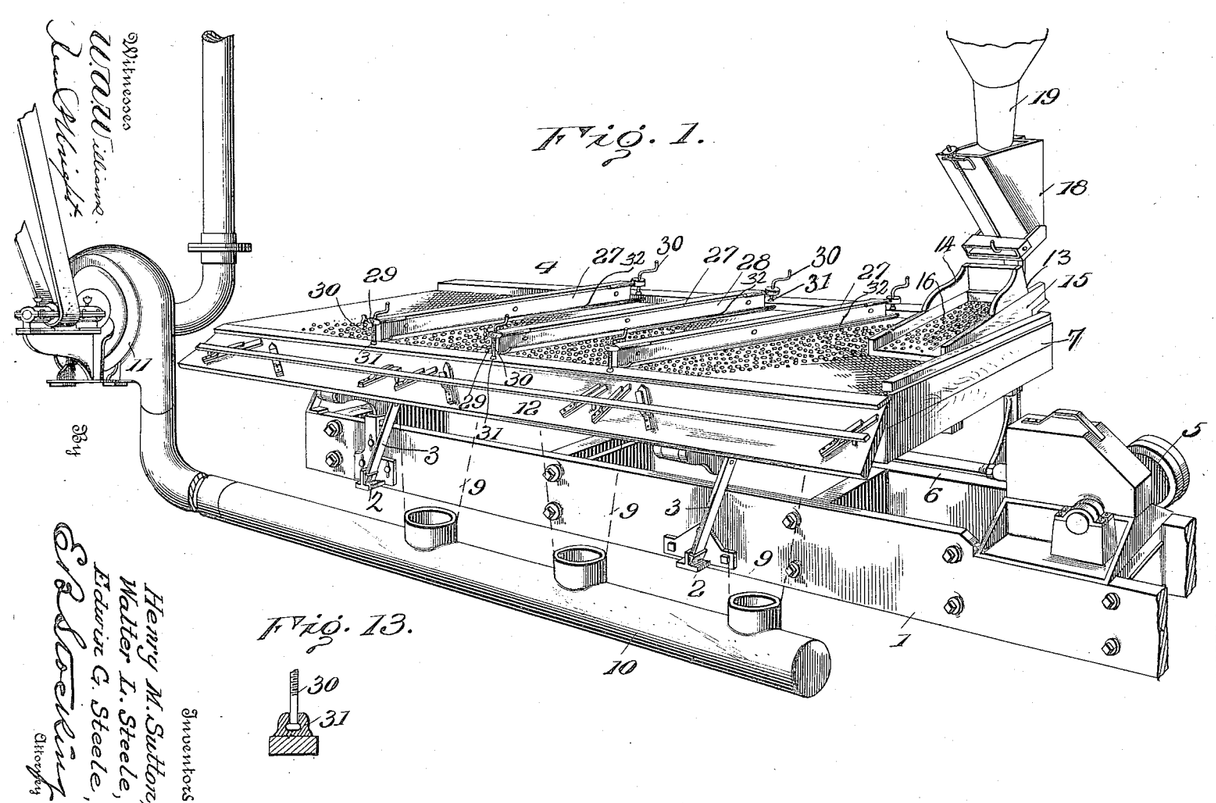
—Figure 1, is a perspective of an apparatus for carrying out our improved process of separating and grading seeds.
Fig. 13, is a detail section showing the manner of mounting one of the adjusting screws upon the deck frame for supporting the baffle bars.
Figure 2:
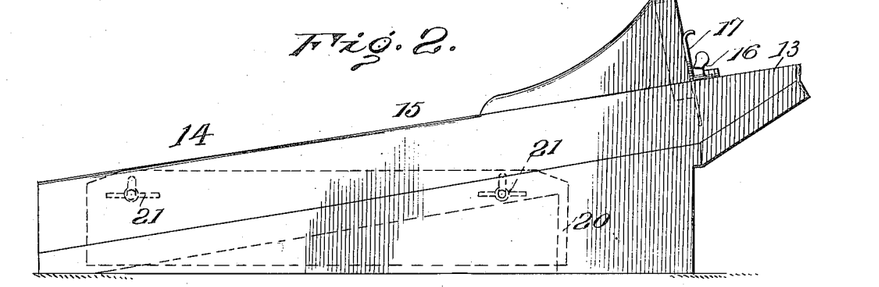
Fig. 2, is a side elevation of the screen for making the initial separation of the grains according to the shape thereof.
Figure 3:
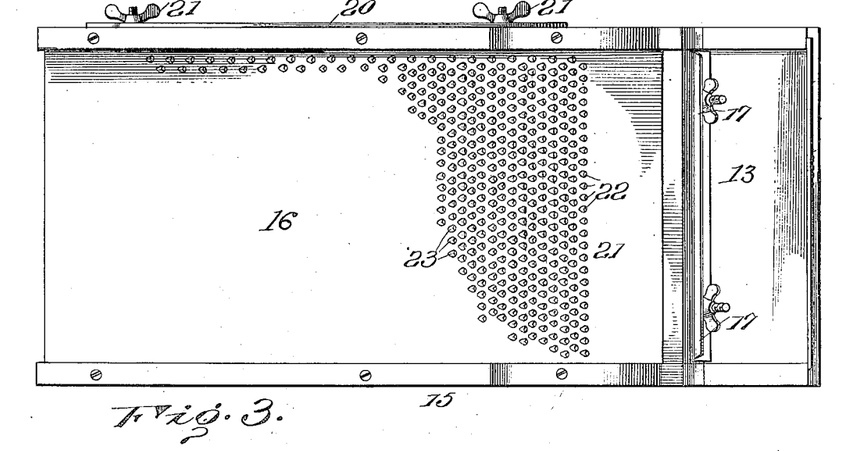
Fig. 3, is a top plan view of the screen.
Figure 4:
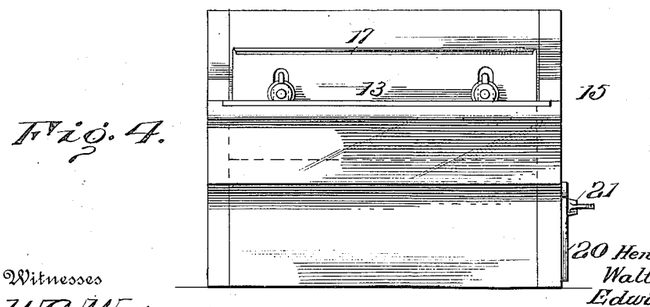
Fig. 4, is an elevation of the feed end of the screen.
Figure 5:
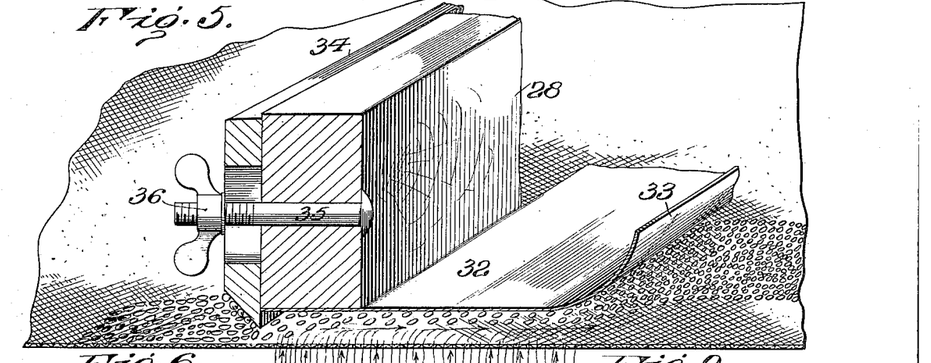
Fig. 5, is a perspective view partly in section, of a portion of the pervious deck and air baffle showing the air currents which pass through the pervious deck, striking the baffle in order to retard and propel backwardly the more spherical grains of oats which have been deposited upon the pervious deck from the initial separating screen.

The screening unit 14 comprising the frame 15 which supports the screening surface at an incline, is adapted to be placed upon the pervious deck of the table in the position shown in Fig. 1, one side of the frame thereof being provided with a gate 20 locked in its adjusted position by thumb nuts 21 in order to control the discharge of the more spherical grains therefrom which are propelled by the propelling movement of the table longitudinally out of the frame on the pervious deck.

The screening surface as shown in Figs. 2, 3, 4, 6, 7 and 8, is preferably formed of a sheet metal plate 21ˣ having rows of staggeredly arranged oval-shaped openings 22 and to the under side of said plate and extending transversely thereof, are secured metal strips 23 which are bent longitudinally to form curved or concaved guards 23' against which the seeds in their passage over the screening surface strike; the longer seeds being tilted upwardly while the round seeds pass through the openings and roll off of the guards upon the pervious deck of the table. As the long seeds such as the oat kernels which are herein mentioned to demonstrate the operation of our improved construction of seed separator and grader, strike the guards and are tilted in the position shown in Fig. 12, they are struck by the mass of seeds traveling by gravity down the inclination thereof, the long seeds are turned over away from the opening and are finally deposited from off of the discharge end of the screening surface.

Figures 6, 7, 8, 9, 10, 11, 12:
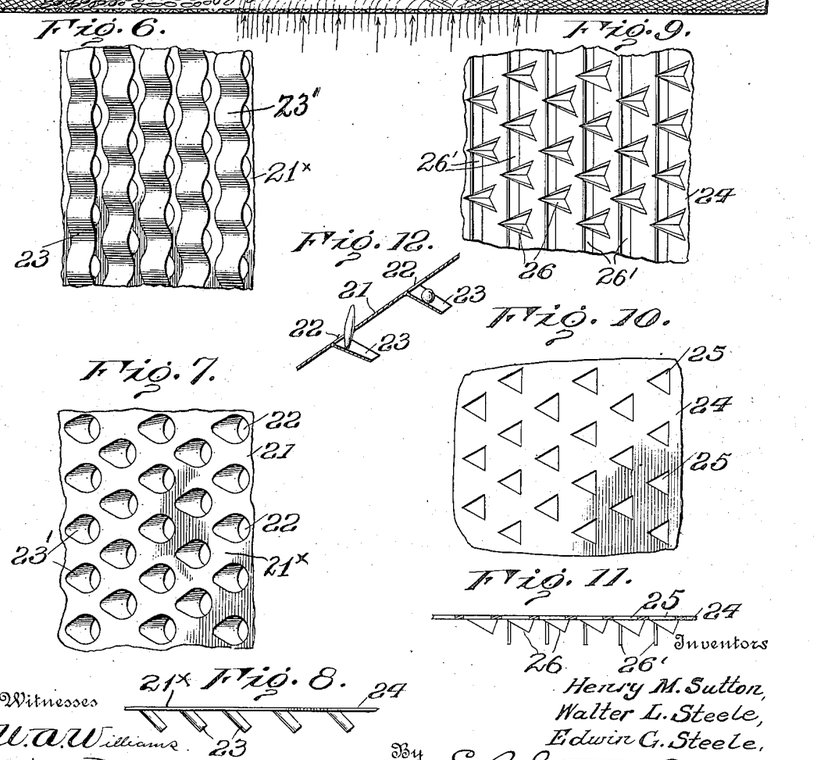
Fig. 6, is a detail inverted plan view of one form of screening surface.
Fig. 7, is a detail top plan view.
Fig. 8, is a detail side elevation.
Fig. 9, is an inverted plan view of another form of screening surface.
Fig. 10, is a detail plan view of the modified form shown in Fig. 9.
Fig. 11, is a detail section of the modified forms shown in Figs. 9 and 10.

In the modifications shown in Figs. 9, 10 and 11, instead of providing oval-shaped openings in the screening surface, a plate 24 is employed which is provided with triangular-shaped openings 25 which are provided with substantially V-shaped guards 26 to prevent the long grains of seed from passing therethrough and it will be seen that in both forms of screening surface, the long or pointed seeds strike the guards and by the conformation thereof, are carried to the longitudinal center of the opening so as to hold the same in such a position that when the same is engaged by the mass upon the screen, they will not be deflected and cannot possibly pass through the opening. As the long seeds are struck by the mass when in this position, they are turned over away from the opening and move by gravity and the agitation of the table, in such a manner that this operation may be repeated a number of times before the seeds reach the discharge end of the sizing unit.

When the sizing unit is in the position as shown in Fig. 1 upon the pervious deck, the mass of seeds upon the sizing surface is subjected to an air current which causes the lighter seeds to be repelled in passing through the openings of the sizing surface and the longer and lighter grains are blown from out of the openings and caused to travel by gravity down the inclined screen.

In some cases where only a slight air pressure is used it has been found necessary in order to prevent the longer and lighter grains from passing through the screening units to provide supplemental guards 26' which prevent the long seeds from passing through the screening surface. However, we have found by experimenting that by dispensing with the supplemental guards and using either form of screening surface as shown with a sufficient air current, the capacity of the screen is enormously increased.

In order to provide means upon the deck to separate the spherical or approximately spherical, oat seeds which have passed through the screening surface with the grains of wheat, we arrange upon the table a series of parallel air baffles 27, the construction of one of these baffles being sufficient for all, as they are constructed identically, and while we have shown three of these baffles used, we do not wish to limit ourselves to any number, as in separating certain kinds of seeds or cereals, good results might be obtained with one, while with other classes of seeds, it might be necessary to increase the number. Each baffle comprises a supporting bar 28 arranged diagonally across the table deck having a threaded lug 29 projecting outwardly from each end, in which is mounted an adjusting screw 30 which has its lower end swiveled in a socket 31 secured upon the frame of the table to allow the bars to be adjusted vertically in respect to the deck of the table. Secured to the under side of the bar is a baffle plate 32 which extends laterally therefrom and is provided with a curved end 33, said plate extending toward the feed end of the table. Adjustably mounted upon the opposite side of the bar 28 is a strip 34 provided with vertically disposed slots through which bolts 35 extend, said bolts carrying wing nuts 36 for locking said strips in adjusted position in respect to the face of the pervious deck. The strip is provided with a sharpened lower edge and under normal conditions projects about one-eighth of an inch below the bar 28. The air passing through the pervious deck of the table from the air chamber strikes the baffle plate which is preferably adjusted so as to come into contact with the bed of the grain on the table and as the air impinges against the under side of the baffle plate the least resistance to the same is toward the feed end of the table as the adjustable strip 34 extends below the plane thereof and, therefore, the air creates a current in the direction of the feed end of the table which not only retards the movement of the smaller grains of oats, but blows these grains backward against the propelling movement, the current of air being insufficient to repel the movement of the grains of wheat propelled over the surface. As the lighter grains, such as the small grains of oats, are repelled at this point they move transversely over the surface of the deck and are deposited into suitable receptacles, not shown, arranged at the delivery end of the table. The wheat grains are continuously propelled by the propelling movement of the table, the lighter grains gradually working toward the discharge edge thereof while the heavier grains which are in contact with the surface are propelled longitudinally thereon and by arranging a number of these air baffles in relation to each other as shown in Fig. 1, adjacent the feed end of the separating table, all of the particles such as dirt and the like including the small and light grains of oats, will be repelled and discharged from the side of the table and as the mass of heavy seed comes from under the last air baffle, it is subjected to the full action of the table and a separation takes place upon the grains of wheat according to the specific gravity thereof, the lighter grains gradually working transversely off of the edge of the table, and the heavy grains which are the fertile grains, are propelled off of the end of the table. It will be seen that the separation made upon this table is by the specific gravity of the cereals. Without the initial screening unit and the air baffles, the heaviest and longest grains of oats would report and be discharged from the table with the smaller and lighter grains of wheat and in order to overcome this difficulty in separating cereals of all kinds, we have provided an apparatus in which the longer grains are initially separated from the more spherical grains and with means for retarding and repelling the lighter grains of oats so as to cause the same to pass transversely off of the table by gravity which makes a thorough separation of the oats from the wheat. As these air baffles are arranged adjacent the feed end of the table, when the mass of seeds, which in this instance is wheat, has passed under these baffles, all of the oats have been separated therefrom and the wheat grains are free to be separated as to the specific gravity of the grains thereof and in the final movement of the mass of seeds, this takes place so as to grade the wheat in order to separate the fertile from the infertile seeds.

In the operation of an apparatus as herein shown to carry out our improved process for separating and grading seeds and cereals, the machine is set in operation and grain from the feed hopper is fed into the receiving hopper of the screening unit from which it is discharged upon the screening surface until the same has become thoroughly embedded with the seed and as the table is being reciprocated, agitation is imparted by said reciprocation to the screening unit and through the medium of gravity, the seeds in a mass, slide down the screening surface, the longer seeds being forced by the mass and the peculiar shape of the openings, off of the discharge end of the screening unit from which they work themselves by gravity off of the deck of the table. The more spherical-shaped seeds pass through the perforations of the screen and are discharged upon the pervious deck and by the propelling movement thereof, are pushed out of the gate opening and propelled longitudinally upon the table. As the seeds are propelled longitudinally they move transversely and are brought into contact with air currents under the air baffles which repel the lighter seeds such as the more spherical grains of oats which by gravity, work their way off of the side of the table while the heavier spherical grains pass under the baffles. This operation is repeated as each air baffle is reached by the movement of grain being propelled upon the table and we have found by experimenting that three air baffles arranged diagonally upon the table as shown, are sufficient to repel all of the lighter grains of oats allowing only the grains of wheat to pass under the baffles by the propelling movement of the table. After the mass has passed the last baffle in the series, the grains of oats have been entirely freed from the wheat and the wheat is propelled along the table and graded according to the specific qualities of the grains thereof, the lighter grains passing off of the side of the table, while the heavier grains are passing off of the end of the table, these grains being the fertile grains. When the mass is delivered upon the pervious deck within the frame of the screening unit, it is supported by a gaseous cushioning medium in order to allow the grains to stratify; the heavier grains being in contact with the deck being propelled by the propelling movement thereof, while the lighter grains, which are above the heavier grains, move by gravity substantially transversely thereof.

Prior to this invention, the separation of oats from wheat in quantities to meet the commercial requirements of grain elevators, has not been commercially accomplished as in prior machines, which attempted to accomplish this result, the capacity was so small that the separation could not be commercially carried out, but we have found that with our improved construction of separating apparatus, a machine is produced which has a capacity sufficient to meet all requirements and which can be operated at a minimum expense without any care or attention, after the same has been set in operation.

While we have described an apparatus and process for separating wheat from oats, it is of course, understood that the same can be used for separating various other kinds of seeds such as flax seed from millet; grass seed from oats; alfalfa seed from various other kinds of mixtures, and we do not wish to limit ourselves as to the nature of material to be separated, as the process and apparatus can be used for separating any and all kinds of cereals and seeds, without departing from the spirit of our invention.

We claim:

1. The process of separating a mass of seeds, consisting in supporting the mass upon an inclined support and imparting to said mass, a positive movement across its path of travel by gravity, and repelling the substantially lighter particles of said mass in a direction opposite to the imparted movement of said particles.

2. The process of separating and grading a mass of seeds, consisting in initially separating the longer seeds from the shorter seeds, supporting the shorter seeds upon an unobstructed surface by a gaseous cushioning medium, imparting to said mass a positive movement, and repelling the movement of the lighter particles of said mass.

3. The process of separating and grading a mass of seeds, consisting in feeding said mass initially upon a screening unit to separate the longer seeds from the shorter seeds, supporting the shorter seeds of said mass upon a transversely inclined supporting surface, imparting to said mass a longitudinal movement upon said surface, and retarding the longitudinal movement of the lighter seeds of said mass, and separately collecting the thus separated seeds.

4. The process of separating and grading seeds, consisting in initially separating the longer seeds from the shorter seeds, supporting the shorter seeds upon an unobstructed transversely inclined surface by a gaseous cushioning medium to permit stratification thereof, imparting a positive movement to said seeds, across the movement of said material by gravity, and separately collecting the thus separated seeds.

5. The process of separating and grading a mass of seeds, consisting in initially separating the longer seed from the shorter seed, propelling the mass of shorter seed in a predetermined direction, repelling the travel of said mass in said direction, and separately collecting the thus separated seeds.

6. The process of separating and grading a mass of seeds, having different characteristics, consisting in initially separating the longer seeds from the shorter seeds, feeding said shorter seeds upon a reciprocating pervious deck, subjecting said shorter seeds to a continuous air pressure, condensing said air pressure at predetermined points across the path of travel of said material, and separately collecting the thus separated and graded seeds.

7. The process of separating and grading a mass of seeds, having different characteristics, consisting in initially separating the longer seeds from the shorter seeds, delivering said shorter seeds upon a transversely inclined pervious deck, supporting said seeds upon a gaseous cushioning medium, propelling said seeds longitudinally upon said surface, repelling the movement of the relatively lighter seeds across the path of travel of said mass, and separately collecting the thus separated and graded seeds.

8. The process of separating and grading a mass of seeds, having different characteristics, consisting in supporting said mass upon a transversely inclined surface by a gaseous cushioning medium, imparting to said mass a longitudinal propelling movement, retarding said mass in its longitudinal movement, and separately collecting the thus separated and graded particles.

9. The process of separating and grading a mass of seeds, having different characteristics, consisting in supporting said mass upon a surface by a gaseous cushioning medium, feeding said material in one path, simultaneously imparting to said material a positive movement in the line of feed, repelling the movement of the lighter particles of said mass in the line of the propelling movement, and separately collecting the thus separated and graded seeds.

10. The process of separating and grading a mass of seeds having different characteristics, consisting in propelling the seeds in a predetermined direction upon an unobstructed transversely inclined surface, supporting said mass upon said surface by a gaseous cushioning medium, repelling the movement of the lighter seeds across the direction of the propelling movement, and separately collecting the thus separated and graded seeds.

11. The process of separating and grading seeds, consisting in initially separating the longer seeds from the shorter seeds, subjecting said shorter seeds to a propelling movement upon an unobstructed surface, supporting said seeds upon a gaseous cushioning medium, intensifying said gaseous cushioning medium in the line of the propelling movement of said material to repel the lighter seeds of said mass, and separately collecting the thus separated seeds.

12. The process of separating and grading seeds, consisting in supporting a mass of seeds upon a transversely inclined pervious deck, imparting to said material a movement across the line of travel by gravity, repelling the movement of said material, and separately collecting the thus separated seeds.

13. An apparatus for separating and grading seeds, comprising a reciprocating table having a pervious deck, a screening unit mounted upon said deck at the feed end thereof, air baffles arranged above said deck, and means for collecting the separated seeds from said deck.

14. An apparatus for separating and grading seeds, consisting of a transversely inclined longitudinally reciprocating pervious deck, a screening unit mounted upon said deck, having a discharge gate at one side thereof, air baffles arranged diagonally across said deck for repelling the comparatively lighter grains of seed, and means for collecting the separated seeds discharged from said deck.

15. In a machine for separating and grading seeds, a laterally inclined pervious separating surface, mechanism for reciprocating said surface, means for feeding the mass of substantially the same shaped seeds upon said surface, means for supporting said mass upon a gaseous cushioning medium, means for repelling the movement of the lighter seeds of said mass in their longitudinal movement upon said surface, and means to collect the separated and graded seeds from said surface.

16. In a machine for separating and grading a mass of seeds, having different characteristics, a laterally inclined separating surface, pervious to air under pressure and impervious to the passage of material therethrough, means for separating the longer seeds from the shorter seeds at one end of said table, intermediate means for removing the lighter seeds from the heavier seeds, and means for propelling the mass of seeds upon said table across the path of travel by gravity, and means for separately collecting the separated and graded seeds from said surface.

17. In a machine for separating and grading seeds, the combination with a transversely inclined separating surface, means for maintaining a constant air pressure beneath said surface, means for imparting longitudinal movement to the material delivered upon said surface, air baffles arranged diagonally across said surface, and means for separately collecting the separated and graded seeds from said surface.

18. A grain separating table, having means for imparting movement to the mass of seeds delivered thereon in a predetermined direction, a series of air baffles arranged diagonally across said surface, means for maintaining a constant air pressure beneath said surface, and means for collecting the separated seeds from said surface.

19. The process of separating and grading seeds, consisting in initially separating the longer seeds from the shorter seeds upon a screening unit, depositing the shorter seeds upon a reciprocating pervious deck, supporting said seeds upon said deck by a gaseous cushioning medium, repelling said seeds in their longitudinal movement upon said deck to separate the lighter from the heavier seeds, and separately collecting the separated and graded seeds from said deck.

20. The process of separating a mass of seeds, having different characteristics, consisting in supporting the mass upon a surface by a gaseous cushioning medium, simultaneously imparting to said mass a positive movement, subjecting said mass to the action of gravity upon said surface, in lines deviating from the line of positive movement, retarding the movement of the lighter seeds of said mass in their positive movement, and separately collecting the thus separated and graded seeds.

21. The process of separating and grading a mass of seeds, having different characteristics, consisting in supporting the mass upon an inclined surface by a continuous air pressure to cause a gravital movement of the mass, imparting to said mass, a propelling movement in a direction across the movement of the material by gravity, repelling the movement of the lighter seeds of said mass in their propelling movement, and separately collecting the thus separated and graded seeds.

22. The process of separating a mass of seeds, having different characteristics, consisting in initially separating the longer seeds from the shorter seeds, supporting the shorter seeds upon a transversely inclined surface by a gaseous cushioning medium, propelling said material in a direction across the gravital movement of said mass, repelling the lighter seeds of said mass in their longitudinal movement upon said surface, and separately collecting the thus separated seeds.

23. The process of separating and grading a mass of seeds, consisting in initially separating the longer seeds from the shorter seeds, supporting the shorter seeds upon a transversely inclined surface by a gaseous cushioning medium, simultaneously imparting to said mass upon said surface, a propelling movement, repelling the movement of the lighter seeds of said mass in their propelling movement, and separately collecting the thus separated and graded seeds from said surface.

24. The process of separating and grading a mass of seeds, consisting in subjecting said mass to an initial separation upon an inclined screening unit, discharging the shorter seeds of said mass from said screening unit upon a transversely inclined pervious deck, supporting said mass upon said deck by a gaseous cushioning medium, imparting to said mass upon said deck, a propelling movement, repelling the lighter seeds of said mass in their propelling movement, and separately collecting the thus separated and graded seeds.

25. The process of separating and grading a mass of seeds, having different characteristics, consisting in supporting said mass upon a transversely inclined pervious surface by a gaseous cushioning medium, imparting to said mass upon said surface, a longitudinal movement, and repelling the longitudinal movement of said mass adjacent the feed end of said surface, and separately collecting the thus separated and graded particles.

26. In a seed separating and grading apparatus, the combination with a transversely inclined pervious deck, of means for reciprocating said deck, means for maintaining beneath said deck, a uniform upward pressure of air through the deck and the seed upon it, and means for repelling the movement of the lighter grains of said mass upon said deck.

27. In a seed separating and grading apparatus, the combination with a transversely inclined pervious separating surface, of means for longitudinally reciprocating said surface, means for delivering upon one end of said surface, seeds of substantially the same shape, means for maintaining beneath the surface, a uniform upward pressure of air through the pervious surface and the seeds upon it, pneumatic means for repelling the longitudinal movement of the lighter seeds upon said surface, and means for collecting the separated and graded seeds from said surface.

28. A separating and grading apparatus, comprising a transversely inclined pervious deck, means for maintaining beneath the deck, a uniform upward pressure of air through the pervious deck and the material upon it, means for reciprocating said deck, means for delivering particles upon said deck of substantially uniform size, and means for repelling the longitudinal movement of the lighter particles, and means for collecting the separated and graded particles from said deck.

29. A separating and grading apparatus, comprising a transversely inclined reciprocating pervious deck, having a screening unit at one end and a series of air baffles.

30. A separating and grading apparatus, comprising a reciprocating deck, means at one end of said deck for delivering the particles thereon of substantially uniform size, means arranged intermediate on said deck for repelling the lighter particles in their longitudinal movement thereon, and means for collecting the separated and graded particles from said deck.

31. A separating table having a pervious deck, and a screening unit mounted on the feed end thereof for delivering upon said deck material of substantially the same size.

32. A separating table, having a pervious deck, means for maintaining beneath the deck, a uniform upward pressure of air through the pervious floor thereof, and means arranged above said floor for deflecting the upward pressure of air toward the head of said table.

33. A separating table, having a pervious deck, means for maintaining beneath the deck, a uniform upward pressure of air through the pervious deck, bars adjustably mounted diagonally across said deck, baffle plates carried by said bars extending toward the feed end of said table, and strips adjustably mounted upon said bars.

34. An air baffle for a separating table, comprising an adjustably mounted bar, a baffle plate secured to the under side of said bar and extending laterally therefrom, having a curved end, and a strip having a sharpened edge adjustably mounted upon said bar.

35. A separating table, having a pervious deck with means for maintaining beneath the floor thereof, a uniform upward pressure of air through the pervious floor, a screening unit having a frame mounted upon said pervious floor at one end thereof, said screening unit having a discharge gate upon one side and a gate-controlled receiving hopper.

36. In a separating table, the combination with a pervious deck, having means for maintaining beneath the floor thereof, a uniform upward pressure of air through the pervious floor, of a screen having a frame resting upon said pervious deck, said screen having a gate upon one side thereof, 37. A separating and grading apparatus, having a transversely inclined pervious deck with means for maintaining beneath the floor of the deck, a uniform upward pressure of air through the pervious floor thereof, a screen having a frame mounted upon said deck at one end thereof, means for delivering seeds having different characteristics upon said screen, means for discharging seeds from said screen of substantially uniform size, means for propelling said seeds longitudinally upon said deck, and means for repelling the lighter seeds in their longitudinal movement thereon.

38. In a separating table, the combination with a transversely inclined deck, of means for reciprocating said deck, a screening unit mounted upon the feed end of said deck, means for maintaining an upward pressure of air through said deck and the screening unit thereon, means for repelling the longitudinal movement of the lighter seeds delivered from said screening unit, and means for separately collecting the separated seeds.

39. A separating table, having a pervious deck and means for maintaining beneath said deck, a uniform upward pressure of air through the pervious floor thereof, an initial separating screening unit mounted upon one end of said deck, and adjustable baffles mounted upon said deck having adjustable strips mounted thereon.

40. A separating table, having a pervious transversely inclined deck with means for reciprocating said deck longitudinally, means for delivering material upon a screening unit arranged at one end of said deck, means for discharging from said screening unit upon said deck, seeds of substantially uniform size and shape, and means for repelling the longitudinal movement of the lighter seeds delivered upon said deck.

41. The combination with a separating table, having a pervious deck with means for maintaining a uniform upward pressure beneath the deck and through the floor thereof, of a series of diagonally arranged bars adjustably mounted above said deck, baffle plates carried by said bars, and strips adjustably mounted upon said bars upon the opposite sides from said baffle plates.

42. The combination with a separating table, of bars arranged diagonally above said table, means for adjusting said bars in respect to the surface of said table, baffle plates extending from said bars, and strips adjustably mounted upon said bars having sharpened edges.

43. The combination with a separating table, having a pervious deck, of a baffle plate extending diagonally across said deck, and means for adjusting said baffle plate in respect to said deck.

44. A separating and grading apparatus, comprising a pervious supporting surface, means for maintaining beneath said surface a uniform upward pressure of air through the pervious surface, and a screening unit having a box-like frame mounted upon said pervious surface.

45. In a separating and grading apparatus, the combination with a transversely inclined pervious deck, of means for reciprocating said deck, means for maintaining beneath said deck a uniform upward pressure of air through the deck and the material thereon, and pneumatic means for repelling the lighter particles of said mass upon said deck.

46. An air baffle for a separating table having a pervious surface, comprising an adjustably mounted bar, and a baffle plate carried by said bar and extending laterally therefrom.

47. A separating and grading apparatus, comprising a transversely inclined reciprocating pervious deck, a screening unit mounted upon said deck, and means for maintaining a uniform upward pressure of air through said pervious deck and screening unit.

48. The combination with a separating table, of bars arranged transversely above said table and spaced therefrom, and baffle plates carried by said bars and extending toward the feed end of said table.

49. In a seed separating and grading apparatus, the combination with a pervious supporting surface, means for longitudinally reciprocating said surface, a screening unit having a box-like frame mounted upon said surface and supported thereby, and means for maintaining beneath said surface a uniform upward pressure of air through the pervious surface and the screening unit mounted thereon.

50. A separating apparatus, comprising a pervious deck, a screening unit mounted upon said deck, and means for maintaining a uniform upward pressure of air through said pervious deck and screening unit.

51. The process of separating and grading seeds, consisting in initially separating the longer seeds from the shorter seeds, supporting the shorter seeds throughout the area thereof upon a transversely inclined surface by a gaseous cushioning medium to permit stratification thereof, imparting to said seeds a longitudinal movement upon said surface across the movement of said seeds by gravity, and separately collecting the thus separated seeds.

52. The process of separating and grading a mass of seeds, consisting in subjecting said mass to an initial separation upon a screening unit, discharging the shorter seeds of said mass from said screening unit upon a transversely inclined pervious deck, supporting said mass upon said deck by a gaseous cushioning medium, imparting to said mass upon said deck a propelling movement, and separately collecting the thus separated and graded seeds.

53. In a separating table, the combination with a pervious deck having means for maintaining beneath the floor thereof, a uniform upward pressure of air through the pervious floor, of an air baffle arranged transversely above said floor, and means for adjusting said baffle in respect to said floor.

54. A separating and grading apparatus, comprising a table having a pervious floor, and means for maintaining beneath the floor thereof, a uniform upward pressure of air through the pervious floor, and an air baffle arranged transversely above said floor.

In testimony whereof we hereunto affix our signatures in the presence of two witnesses.

HENRY M. SUTTON.
WALTER L. STEELE.
EDWIN G. STEELE.

Witnesses:
J. N. SPARKS,
H. V. HAYNES.